(12) United States Patent
Ihsan

(10) Patent No.: US 11,001,043 B2
(45) Date of Patent: May 11, 2021

(54) COMPOSITE PRODUCTS

(71) Applicant: ALSITEK LIMITED, Peterborough (GB)

(72) Inventor: Harun Ihsan, Peterborough (GB)

(73) Assignee: ALSITEK LIMITED, Peterborough (GB)

( * ) Notice: Subject to any disclaimer, the term of this patent is extended or adjusted under 35 U.S.C. 154(b) by 183 days.

(21) Appl. No.: 15/739,310

(22) PCT Filed: Jul. 4, 2016

(86) PCT No.: PCT/GB2016/052019
§ 371 (c)(1),
(2) Date: Dec. 22, 2017

(87) PCT Pub. No.: WO2017/006102
PCT Pub. Date: Jan. 12, 2017

(65) Prior Publication Data
US 2019/0292101 A1    Sep. 26, 2019

(30) Foreign Application Priority Data
Jul. 3, 2015 (GB) ...................... 1511721

(51) Int. Cl.
*B32B 37/14* (2006.01)
*B32B 37/12* (2006.01)
(Continued)

(52) U.S. Cl.
CPC ............... *B32B 37/14* (2013.01); *B32B 3/04* (2013.01); *B32B 5/12* (2013.01); *B32B 5/18* (2013.01);
(Continued)

(58) Field of Classification Search
CPC ........ C04B 28/26; C04B 28/006; B32B 5/245
See application file for complete search history.

(56) References Cited

U.S. PATENT DOCUMENTS 4,640,715 A    2/1987 Heitzmann et al.
4,799,349 A *  1/1989 Luckanuck ............ E04C 2/292
                                                428/921
(Continued)

FOREIGN PATENT DOCUMENTS

EP    0494015 A1    7/1992
EP    2868637 A1    5/2015
(Continued)

OTHER PUBLICATIONS

Joseph Davidovits; "Geopolymer Chemistry and Applications", 4th Edition; Institut Geopolumere (2008 original, 4th edition Nov. 2015) p. 160.
(Continued)

*Primary Examiner* — Christopher T Schatz
(74) *Attorney, Agent, or Firm* — EIP US LLP

(57) ABSTRACT

A composite product comprising a metakaolin-based mineral polymer. The composite product has a number of applications including use as a fire resistant material, use as a thermally insulating material and use as an impact resistance material. Methods of preparing a composite product according to the present invention and a kit of parts for preparing the composite product are also disclosed.

18 Claims, 5 Drawing Sheets

(51) Int. Cl.
| | |
|---|---|
| *B32B 5/18* | (2006.01) |
| *B32B 7/12* | (2006.01) |
| *B32B 13/04* | (2006.01) |
| *C04B 14/04* | (2006.01) |
| *C04B 14/14* | (2006.01) |
| *C04B 14/20* | (2006.01) |
| *C04B 14/44* | (2006.01) |
| *C04B 14/46* | (2006.01) |
| *C04B 22/06* | (2006.01) |
| *C04B 28/26* | (2006.01) |
| *C04B 38/00* | (2006.01) |
| *C04B 38/02* | (2006.01) |
| *B32B 13/14* | (2006.01) |
| *B32B 13/02* | (2006.01) |
| *C04B 28/00* | (2006.01) |
| *B32B 5/12* | (2006.01) |
| *B32B 3/04* | (2006.01) |
| *B32B 5/26* | (2006.01) |
| *B32B 5/24* | (2006.01) |
| *B32B 7/02* | (2019.01) |
| *B32B 5/32* | (2006.01) |
| *C04B 103/42* | (2006.01) |
| *C04B 111/00* | (2006.01) |
| *C04B 111/20* | (2006.01) |
| *C04B 111/28* | (2006.01) |

(52) U.S. Cl.
CPC ............... *B32B 5/245* (2013.01); *B32B 5/26* (2013.01); *B32B 5/32* (2013.01); *B32B 7/02* (2013.01); *B32B 7/12* (2013.01); *B32B 13/02* (2013.01); *B32B 13/04* (2013.01); *B32B 13/045* (2013.01); *B32B 13/14* (2013.01); *B32B 37/12* (2013.01); *C04B 14/042* (2013.01); *C04B 14/043* (2013.01); *C04B 14/14* (2013.01); *C04B 14/206* (2013.01); *C04B 14/44* (2013.01); *C04B 14/4668* (2013.01); *C04B 22/062* (2013.01); *C04B 28/006* (2013.01); *C04B 28/008* (2013.01); *C04B 28/26* (2013.01); *C04B 38/0067* (2013.01); *C04B 38/02* (2013.01); *B32B 2250/40* (2013.01); *B32B 2250/42* (2013.01); *B32B 2262/10* (2013.01); *B32B 2262/101* (2013.01); *B32B 2262/105* (2013.01); *B32B 2262/106* (2013.01); *B32B 2264/10* (2013.01); *B32B 2264/104* (2013.01); *B32B 2264/108* (2013.01); *B32B 2307/304* (2013.01); *B32B 2307/3065* (2013.01); *B32B 2307/558* (2013.01); *B32B 2307/72* (2013.01); *B32B 2571/02* (2013.01); *B32B 2605/00* (2013.01); *C04B 2103/42* (2013.01); *C04B 2111/00612* (2013.01); *C04B 2111/2046* (2013.01); *C04B 2111/28* (2013.01); *C04B 2201/20* (2013.01); *C04B 2201/30* (2013.01); *Y02P 40/10* (2015.11)

(56) References Cited

U.S. PATENT DOCUMENTS

| | | | |
|---|---|---|---|
| 5,798,307 | A | 8/1998 | Davidovits et al. |
| 6,992,027 | B1 | 1/2006 | Buckingham et al. |
| 2005/0031843 | A1 | 2/2005 | Robinson et al. |
| 2006/0168906 | A1* | 8/2006 | Tonyan ............... B32B 3/06 52/264 |
| 2012/0192765 | A1 | 8/2012 | Huynh |
| 2016/0244366 | A1* | 8/2016 | Turcinskas ......... C04B 28/006 |

FOREIGN PATENT DOCUMENTS

| | | |
|---|---|---|
| EP | 2868638 A1 | 5/2015 |
| FR | 2512808 A1 | 3/1983 |
| GB | 2521992 A | 7/2015 |
| WO | 2004076378 A1 | 9/2004 |

OTHER PUBLICATIONS

Nalco Company; "The Nalco Guide to Boiler Failure Analysis", 2nd Edition; Chapter 3: Short-Term Overheating, McGraw-Hill Professional (2011) pp. 47-55.

T. W. Eagar & C. Musso; "Why did the World Trade Center Collapse?" (2001) Science, Engineering and Speculation—Journal of Minerals, Metals and Materials Society. (53, 12, pp. 8-11).

Warren C. Young et al. (Roark); "Roark's Formulas for Stress & Strain", Seventh Edition (1989 original 2002 Seventh Edition).

United Kingdom Combined Search and Examination Report dated Dec. 23, 2015 on related Application No. GB 1511721.1 filed Jul. 3, 2015.

International Partial Search Report dated Sep. 23, 2016 on related PCT Application No. PCT/GB2016/052019 filed Jul. 4, 2016.

International Search Report and Written Opinion dated Nov. 17, 2016 on related PCT Application No. PCT/GB2016/052019 filed Jul. 4, 2016.

International Preliminary Report on Patentability dated Oct. 19, 2017 on related PCT Application No. PCT/GB2016/052019 filed Jul. 4, 2016.

* cited by examiner

COMPOSITE PRODUCTS

The present invention relates to composite products. In particular, the present invention relates to composite products comprising mineral polymers, methods of making the same, and uses of the same as fire resistant, thermally insulating and impact resistant materials.

INTRODUCTION

Fire protection is an important factor in many industries and situations, particularly in civil and military shipping, as well as road and rail transport.

Panels are often employed on ships and vehicles to prevent the spread of fire between compartments defined by the panels. The panels may also serve as structural members that support fixtures and fittings in the compartments or as integral strengthening members in the ship or vehicle.

Typically steel or other metal panels are used to afford adequate fire protection, often with additional layers of fire-resistant mineral fibre wool to afford additional thermal insulation. Various aesthetic and corrosion resistant surface coatings are often applied.

A disadvantage of steel panels is the high density of steel (typically 7 to 8 $g/cm^3$) and thus the sum of the defining panels in a ship or other vehicle often make up a significant proportion of the total weight. As one of the main purposes of these means of transport is to carry passengers and/or goods, the inevitable consequence is that each tonne of panels means a tonne of cargo or passenger that cannot be carried. Extra weight also causes greater fuel consumption.

In military shipping, the steel has to be a particularly heavy gauge to afford a degree of armour externally, as well as internally to afford protection from fragments of munitions that enter the craft.

Furthermore, vehicles, such as fire engines or military trucks such as armoured personnel carriers and tanks are often provided with armour that renders them relatively speaking safe from fire. Such vehicles must also be protected from impact or penetration by projectiles of e.g. rocket propelled grenades, bullets of heavy machine guns and light artillery. Another element of protection that may be needed is from improvised explosive devices, hidden in the paths of military vehicles and detonated automatically or remotely. Protection is needed to enable such vehicles to absorb a significant amount of ordinance energy, kinetic energy or projectile energy.

Personnel may come under attack during a tactical situation and may need the protection of temporary energy absorbing shelters to enable them to remain securely protected for the duration of an attack in, for example, training or real fire or combat setting.

Armour, in particular body armour worn by a person, is often heavy and cumbersome. This can impede the wearer at times when mobility and agility are required. This could be for a soldier in a combat situation, a firefighter in a burning building, or the police or other civil authorities requiring protection when confronted with a dangerous situation. Body armour may take the form of a shield or a helmet, vest, or other item of clothing and be designed to prevent or limit damage to the wearer from the impact of a bullet, a knife attack or impact from another hard object.

Current armoury is mostly either based around steel or ceramic as energy absorbers and/or deflectors of an impact by e.g. a projectile. As discussed above, steel is a heavy material and must be significantly thick in order to withstand most ballistic impacts. Ceramic materials, which are also heavy (typically having a density of 2 to 4.5 $g/cm^3$), are less resistant to ballistic impact than steel and thus an even greater thickness is required resulting in heavy, bulky as well as expensive articles.

Foamed mineral polymer panels have been described for building applications in FR2512808. The typical advantages of using mineral polymer panels are described as insulation generally and the ability to moderate fluctuations in humidity within the building.

To date, known foamed mineral polymer materials e.g. the foamed mineral polymer panels described in FR2512808 are not suitable for transport and/or military applications where materials need to have tensile strength and impact resistance on parity with steel panels.

Fly ash based foam products/panels are also known but are unsuitable for these applications because they are too dense, have too high a thermal conductivity and are too variable in quality. Because of their variability, they are also very difficult to manufacture repeatably to a consistent standard.

Mineral polymer products/panels that incorporate a metal skin are also known but are again too heavy for the transport and military applications mentioned above.

Accordingly, alternative materials to those already finding utility in fire protection and armoured protection are sought. In particular, materials that are lightweight, durable and characterised with the capacity to resist heat, are non-combustible, non-flammable and absorb a significant amount of ordinance energy, kinetic energy and/or projectile energy.

The present invention seeks to provide products and materials that address at least some of these requirements.

SUMMARY

According to the first aspect of the present invention, there is provided a composite product comprising two or more layers, wherein at least one layer comprises a mineral polymer prepared from a mixture comprising about 7 to about 53% by weight of metakaolin.

The composite product comprising a mineral polymer may be prepared from a mixture comprising about 20 to about 40% by weight of metakaolin.

In alternative embodiments, the mixture may comprise between about 15 to about 40% by weight of metakaolin, about 20 to about 30% by weight of metakaolin or about 25 to about 35% by weight of metakaolin.

The mineral polymer may be prepared from a mixture comprising up to 65% by weight of filler. Preferably, the mineral polymer may be prepared from a mixture comprising up to 55% by weight of filler, more preferably, up to 30% by weight of filler.

The filler may comprise one or more selected from the group consisting: mica, wollastonite, basalt, molochite, cordierite, feldspar, zircon, graphite, borax and mullite e.g. white mullite.

In some embodiments, the filler is mica and the mixture further comprises up to 53% by weight of mica. Preferably, the mixture further comprises up to 30% by weight of mica. In some embodiments, the mica in the mixture may be present in an amount between about 5 to about 15% by weight. In alternative embodiments, the mica may be present in an amount between about 15 to about 30% by weight.

In some embodiments, the mixture may comprise about 1 to about 22% by weight of an alkali metal hydroxide. Preferably, the mixture comprises between about 4 to about 22% by weight of an alkali metal hydroxide, more preferably between about 4 and about 15% by weight of an alkali metal hydroxide, even more preferably between about 6 to about 13% by weight of an alkali metal hydroxide.

The mixture may comprise between about 13 to about 81% of an aqueous alkali metal silicate solution (with 15 to 50% by weight of an alkali metal silicate relative to the solvent in the silicate solution). The mixture may comprise about 10 to about 20% by weight of an alkali metal silicate solution (with 15 to 50% by weight of an alkali metal silicate relative to the solvent in the silicate solution).

The mixture may comprise about 35 to about 50% by weight of an aqueous alkali metal silicate solution (with 15 to 45 by weight of an alkali metal silicate relative to the solvent in the silicate solution).

The mixture may further comprise about 0.01 to about 20% by weight of a blowing agent.

In an embodiment of the invention, the composite product comprises a foamed mineral polymer prepared from a mixture comprising:
  about 20 to about 40% by weight of metakaolin;
  up to 30% by weight of a mica;
  about 4 to about 22% by weight of an alkali metal hydroxide;
  about 13 to about 81% by weight of an aqueous alkali metal silicate solution (with 15 to 50% by weight of an alkali metal silicate relative to the solvent in the silicate solution);
  about 0.05 to about 6% by weight of a blowing agent; and
  optionally water.

In an embodiment of the invention, the composite product comprises a foamed mineral polymer prepared from a mixture comprising:
  about 20 to about 40% by weight of metakaolin;
  up to 30% by weight of a mica;
  about 1 to about 15% by weight of an alkali metal hydroxide;
  about 0.05 to about 5% by weight of a blowing agent; and
  optionally water.

The mixture may comprise about 20 to about 30% by weight of metakaolin, 20 to 30% by weight of a mica, and 1 to 10% by weight of an alkali metal hydroxide.

In another embodiment of the invention, the composite product comprises a foamed mineral polymer prepared from a mixture comprising:
  about 20 to about 30% by weight of metakaolin;
  about 5 to about 15% by weight of mica;
  about 10 to about 20% by weight of an alkali metal silicate;
  about 6 to about 13% by weight of an alkali metal hydroxide;
  about 0 to about 4% by weight of an alkali resistant glass fibre;
  about 0.5 to about 6% by weight of a blowing agent;
  about 0.5 to about 4% by weight of talcum; and
  optionally water.

It will be understood by those skilled in the art that where appropriate, the amounts up to 100% by weight may be made up of one or more other component(s), for example, water.

Preferably, the foamed mineral polymer has a density of 0.05 to 0.9 g/cm$^3$, more preferably 0.05 to 0.4 g/cm$^3$.

In an embodiment of the invention, the composite product comprises one or more fibre-based material layers. Preferably, the fibre-based material layers comprise a mineral fibre.

Said fibre-based material layers may comprise a mineral fibre selected from the group consisting of: basalt, glass, silicon carbide and carbon fibres.

In some embodiments, the composite product comprises two or more fibre-based material layers, each layer comprising one or more fibres arranged in a predetermined orientation and wherein the predetermined orientation of fibres of an adjacent fibre-based material layer differs by between about 1° to 20°.

In another embodiment of the invention, the composite product comprises one or more non-foamed mineral polymer layers.

Preferably, the non-foamed mineral polymer layer is prepared from a mixture comprising:
  about 15 to about 40% by weight of metakaolin;
  about 5 to about 50% by weight of wollastonite;
  about 5 to about 20% by weight of potassium silicate; and
  about 4 to about 18% by weight of potassium hydroxide; and
  optionally water.

In alternative embodiments, the wollastonite in the non-foamed mineral polymer may be replaced with fillers including but not limited to, a mica, molochite, cordierite, basalt, feldspar, zircon, graphite, borax, basalt powder and mullite e.g. fused white mullite.

The composite product may comprise two or more layers of a foamed mineral polymer and/or a non-foamed mineral polymer.

In some embodiments, the composite product comprises at least one layer of a foamed mineral polymer.

In some embodiments, the composite product comprises at least one layer of a non-foamed mineral polymer.

In some embodiments, the composition may comprise about 25 to about 35% by weight of metakaolin, about 5 to about 15% by weight of potassium silicate, about 5 to about 20% by weight of wollastonite and/or about 4 to about 12% by weight of potassium hydroxide.

In some embodiments, the mixture may further comprise one or more fibrous materials.

Preferably, the non-foamed mineral polymer has a density of 0.08 to 2.0 g/cm$^3$, more preferably 1.0 to 1.8 g/cm$^3$.

In some embodiments, the product comprises an inner layer and at least one outer layer, wherein the inner layer comprises a mineral polymer. For example, the inner layer may be a core and the outer layer may be a coating or layer of another material such as a non-foamed mineral polymer or a fibre-based material. The outer layer may surround the inner layer partially or fully.

According to the second aspect of the present invention, there is provided use of a composite product as herein described as a non-combustible, fire resistant, fire proof and/or thermally insulating material.

In an embodiment, there is further provided use of the composite product as an impact resistance material.

According to the third aspect of the present invention, there is provided a method of preparing a composite product comprising two or more layers, the method comprising:
  providing at least one layer comprising a mineral polymer prepared from a mixture comprising about 7 to about 53% by weight of metakaolin.

In some embodiments, the mineral polymer may be prepared from a mixture comprising about 20 to about 40% by weight of metakaolin Preferably the method comprises:
  providing a first layer (i) comprising a foamed mineral polymer prepared from a mixture comprising about 20 to about 40% by weight of metakaolin;

providing at least a second layer comprising:
  (ii) a non-foamed mineral polymer prepared from a mixture comprising about 15 to about 40% by weight of metakaolin; or
  (iii) a fibre-based material.

The foamed mineral polymer mixture may comprise about 20 to about 35% by weight metakaolin or 20 to 30% by weight of metakaolin. The non-foamed mineral polymer mixture may comprise about 25 to about 35% by weight metakaolin.

Preferably, the method comprises binding the two or more layers using an adhesive or other fixing means.

In some embodiments, the method comprises applying a second layer of (i), (ii) or (iii) to a first layer of (i) and allowing the mineral polymer to cure.

According to the fourth aspect of the present invention, there is provided a kit of parts for preparing a composite product comprising two or more layers, the kit comprising a mineral polymer as herein described. Preferably the kit of parts further comprises instructions for use.

FIGURES

The present invention is described with reference to the figures of the accompanying drawing as follows.

DETAILED DESCRIPTION

Figure 1:
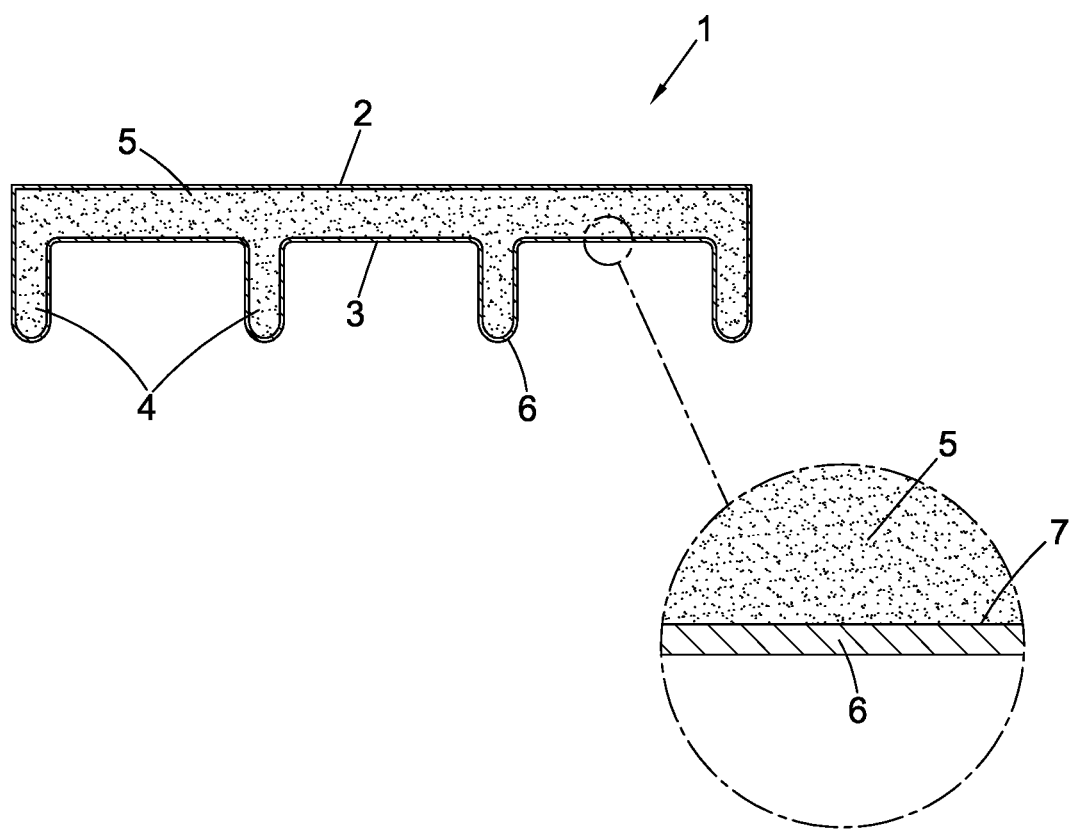
FIG. 1 is a schematic profile of a composite product according to an embodiment of the invention.

According to the first aspect of the present invention, there is provided a layered composite product comprising two or more layers, wherein at least one layer comprises a mineral polymer prepared from a mixture comprising about 7 to about 53% by weight of metakaolin The composite product comprising a mineral polymer may be prepared from a mixture comprising about 20 to about 40% by weight of metakaolin.

The mixture may comprise about 15 to about 40% by weight of metakaolin, preferably about 20 to about 35% by weight of metakaolin, or more preferably about 20 to about 30% by weight of metakaolin.

Mineral polymers, also known synonymously as "geopolymers", are a member of a class of synthetic aluminosilicate polymeric materials. They are formed by reacting, for example via dissolution, an aluminosilicate in an alkaline silicate solution or an acidic medium, which upon condensation (curing) forms a mouldable, homogeneous polymeric product.

Advantageously, the raw materials for the preparation of mineral polymers are readily available on a worldwide basis and in non-conflict areas. They are not based on materials that are in limited supply, thus production is not very susceptible to fluctuations and to higher prices.

The composite product of the present invention has applications as a fire resistant, fire proof and/or thermally insulating material. Advantageously, in comparison to other fire resistant materials and products, the composite product of the present invention can withstand temperatures of up to 1200° C. and is also non-combustible.

The mineral polymer mixture may further comprise up to 53% by weight of mica, preferably up to 30% by weight of a mica. In some embodiments, the mixture may comprise between 5 to 15% by weight of a mica, 15 to 30% by weight of a mica or 5 to 30% by weight of mica. "Mica" would be known to those skilled in the art and refers to a group of sheet silicate (phyllosilicate) minerals. Common types of mica include biotite, lepidolite, muscovite, phlogopite, zinnwaldite, clintonite.

Preferably, the mica used in the present invention comprises a muscovite mica. Muscovite mica, otherwise known as common mica, isinglass, or potash mica is a phyllosilicate mineral of aluminum and potassium with formula $KAl_2(AlSi_3O_{10})(F,OH)_2$, or $(KF)_2(Al_2O_3)_3(SiO_2)_6(H_2O)$. In one embodiment of the invention, the mica may be muscovite mica.

In an embodiment of the invention, the composite product comprises a foamed mineral polymer. In the context of the present invention, the person skilled in the art will understand what is meant by a foamed material.

By way of example, a foamed material is a substance (e.g. a particle or other object) that is formed by trapping pockets of gas. As a result, a proportion of the internal volume of a foamed substance is a gas. The greater the content of gas, the lower the density of the substance. A non-foamed material should be substantially free of trapped gas, although small amounts of trapped gas may be present, such as might be introduced from a preparative method.

The foamed material will typically contain a network of gaseous voids (cells) throughout its volume which may take an open- or closed-cell arrangement.

In accordance with the present invention, the foamed mineral polymer will preferably have greater than 5%, and more preferably greater than 10%, of its internal volume consisting of gaseous voids. In some embodiments, the mineral polymer will have up to 80% of its internal volume consisting of gaseous voids. The term "internal volume" refers to any part of the material defined by the geometrical envelope of the part. Thus, gaseous voids may be enclosed in the material or on the surface of the material. Preferably, the size of the voids may be between 50 μm to 4 mm.

A blowing agent, also referred to as foaming agent or gaseous agent, is typically used in the preparation of the foamed mineral polymer according to some of the aspects and embodiments of the present invention. This may be any blowing agent suitable in the preparation of geopolymer materials including hydrogen peroxide or non-ferrous metals such as aluminium powder or zinc powder.

Preferably, hydrogen peroxide is used, but finely divided aluminium or other gas producing material may also be used. In the case of hydrogen peroxide, there is a reaction with the alkaline chemistry of the mixture that breaks the hydrogen peroxide down into water and gaseous oxygen. It is the oxygen evolved in the reaction that provides the blowing within the bulk of the material that creates the voids. Alternatively a gas may be incorporated by mechanical methods such as mixing, for example, similarly to whipped egg whites. Alternative methods known in the art may also be used to incorporate gas into the mineral polymer material.

The blowing agent used in the preparation of the foamed mineral polymer may be present in an amount between about 0.01 and about 20% by weight.

Preferably, the blowing agent is used in the preparation of the mineral polymer foam at 0.05 to 6% by weight, more preferably 0.05 to 5% by weight, and even more preferably at 0.1 to 3% by weight of the mixture for preparing the foam when using a powder foaming agent, or 0.5 to 6% by weight, more preferably 1 to 5% by weight of a mixture for preparing the foam using a liquid foaming agent.

In an embodiment of the present invention, the foamed mineral polymer is preferably prepared from a mixture comprising about 20 to about 30% by weight of metakaolin, the mixture further comprising:
  about 20 to about 30% by weight of a mica;
  about 4 to about 22% by weight of an alkali metal hydroxide; and
  about 0.05 to about 5% by weight of a blowing agent.

In an embodiment of the present invention, the foamed mineral polymer is preferably prepared from a mixture comprising about 20 to about 30% by weight of metakaolin, the mixture further comprising:
  about 20 to about 30% by weight of a mica;
  about 1 to about 10% by weight of an alkali metal hydroxide; and
  about 0.05 to about 5% by weight of a blowing agent.

Preferably, the mixture comprises about 0.1 to about 3% by weight of a blowing agent when using a powder foaming agent or about 1 to about 5% by weight when using a liquid foaming agent.

Preferably, the foamed mineral polymer material used in the invention has a density of 0.05 to 0.9 g/cm$^3$, and more preferably 0.08 to 0.2 g/cm$^3$.

Preferably, the mica is a muscovite mica.

The mixture may comprise about 5 to about 81% by weight of an aqueous alkali metal silicate solution (with 15 to 50% by weight of alkali metal silicate relative to solvent in the silicate solution).

The mixture may comprise about 13 to about 81% by weight of an aqueous alkali metal silicate solution (with 15 to 50% by weight of alkali metal silicate relative to solvent in the silicate solution).

Preferably, the mixture further comprises about 35 to about 50% by weight of an aqueous alkali metal silicate solution (with 15 to 45% by weight of alkali metal silicate relative to solvent in the silicate solution).

Preferably, the alkali metal silicate is potassium silicate or sodium silicate, most preferably potassium silicate.

The mixture may comprise between about 4 to about 22% by weight of an alkali metal hydroxide. Preferably, the mixture comprises between about 4 to about 22% by weight of an alkali metal hydroxide, more preferably between about 4 and about 15% by weight of an alkali metal hydroxide, even more preferably between about 6 to about 13% by weight of an alkali metal hydroxide.

Preferably, the alkali metal hydroxide is potassium hydroxide or sodium hydroxide, most preferably potassium hydroxide. Mixtures of the alkali metal silicate and alkali metal hydroxide with different cations may be used.

Preferably, the metakaolin is a calcined metakaolin. Most preferably, a metakaolin is milled to a fine powder and flash calcined at approximately 750-800° C. The metakaolin may be calcined at temperatures above 800° C., or above 1000° C. for alternative applications, as described by J. Davidovits (2008).

The mineral polymer mixture may also comprise one or more fibrous materials to impart various physical properties, such as improved strength and to provide reinforcement. The term "fibrous material" refers to a material consisting of, comprising or resembling fibres. Suitable fibrous materials include mineral fibres, carbon fibres, metal-based fibres such as stainless steel fabrics, glass fibres or polymer-based fibres such as Kevlar®. Preferably, the fibrous material comprises an alkali resistant glass fibre.

The fibrous material may be a fibre mesh layer or individual fibres in a helical configuration which may be distributed throughout the mineral polymer material and incorporated in the mixture from which the polymer is prepared as part of a manufacturing process. Alternatively the fibrous material may be a mesh layer that is fully or substantially enclosed by the mineral polymer material.

The "manufacturing process" refers to the process by which the composite products are made or fabricated which may include the preparation of a mineral polymer mixture and may further include the assembly of the mineral polymer into a product which may comprise one or more additional components.

In an example embodiment, the mineral polymer is prepared from a mixture comprising about 20-30% by weight of a metakaolin, about 20-30% by weight of a muscovite mica, about 35-50% by weight of an aqueous alkali metal silicate solution (with 15 to 45% by weight of alkali metal silicate relative to solvent in the silicate solution); about 1-10% by weight of an alkali metal hydroxide; and about 0.1-5% by weight of a blowing (foaming) agent; preferably 1-3% by weight of a blowing agent, up to 100% by weight, which may include the inclusion of one or more fibrous materials.

In another embodiment, the mineral polymer is prepared from a mixture comprising about 23-28% by weight of a metakaolin; about 22-27% by weight of a muscovite mica; about 40-45% by weight of an aqueous alkali metal silicate solution (with 15 to 45% by weight of alkali metal silicate relative to solvent in the silicate solution); about 5-10% by weight of an alkali metal hydroxide; and about 0.1-3% by weight of the blowing agent, up to 100% by weight, which may include the inclusion of one or more fibrous materials.

In another embodiment, the mineral polymer is prepared from a mixture comprising about 25% by weight of a metakaolin; about 24% by weight of a muscovite mica; about 41.5% by weight of an aqueous alkali metal silicate solution (with about 29% by weight of alkali metal silicate relative to solvent in the silicate solution); about 8% by weight of potassium hydroxide; and about 0.5% by weight of the blowing agent.

It will be understood by those skilled in the art that where appropriate, the amounts up to 100% by weight may be made up of one or more other component(s), for example, water. Such component(s) may or may not have a material effect on the functionality of the resultant mineral polymer. The mixture may comprise one or more non-functional materials.

The foamed mineral polymer of the present invention may be prepared from a mixture further comprising up to 60% by weight of a filler. Preferably, the foamed mineral polymer comprises up to 55% by weight of a filler, about 35 to about 55% by weight of a filler, about 40 to about 45% by weight of a filler or about 41.5% by weight of filler.

The term "filler" would be understood by those skilled in the art and may be functional fillers or mineral fillers.

Organic fillers such as plant materials may also be employed. For example, the filler may comprise one or more selected from the group consisting of mica, wollastonite, basalt, molochite, cordierite, feldspar, zircon, graphite, borax and mullite e.g. white mullite.

The filler of the geopolymer foam of the present invention can be selected from any material which may already contains pockets, cell or voids of gas or gaseous material, for example, glass microspheres, aerogels, aeroclays, pearlite or vermiculite. The filler, for example, may also be used to fully or partially replace the mica in the mixture.

In an embodiment, the foamed mineral polymer is prepared from a mixture comprising about 20-30% by weight of a metakaolin; about 20-30% by weight of a muscovite mica; about 0.5-55% by weight of an additional filler; about 1-10% by weight of an alkali metal hydroxide, up to 100% by weight, which may include one or more fibrous materials.

In another embodiment, the foamed mineral polymer is prepared from a mixture comprising about 23-28% by weight of a metakaolin; about 22-27% by weight of a muscovite mica; about 40-45% by weight of a filler; about 5-10% by weight of an alkali metal hydroxide; and about 0.1-3% by weight of the blowing agent, up to 100% by weight, which may include one or more fibrous materials.

In another embodiment, the foamed mineral polymer is prepared from a mixture comprising about 25% by weight of a metakaolin; about 24% by weight of a muscovite mica; about 41.5% by weight of a filler; and about 8% by weight of potassium hydroxide and about 0.3% by weight of the blowing agent, up to 100% by weight, which may include one or more fibrous materials.

In some embodiments of the invention, the mineral polymer may be prepared from a mixture further comprising talcum. The term "talcum" will be understood by those skilled in the art as a naturally occurring form of magnesium silicate with the formula $Mg_3Si_4O_{10}(OH)_2$ and include for example steatite and soapstone. The type of talcum used has been found to have an effect on the homogeneity and size of the pores/voids of the mineral polymer.

The addition of talcum imparts lower density to the foam which advantageously further enhances the specific strength of the product. By "specific strength", it is meant the strength per kilogram of material used. For example, a 1 $m^2$ panel of steel has a lower tensile strength in comparison to a 1 $m^2$ composite panel of the same mass formed from the mineral polymer as herein described. The term "panel" has the ordinary everyday meaning and typically refers to a flat, or substantially flat component that forms or is set into the surface of a door, wall or ceiling but is not limited to this use.

In an example embodiment, the foamed mineral polymer is prepared from a mixture comprising 20-30% by weight of metakaolin, 9-16% of mica, 10-20% by weight of a metal silicate preferably potassium silicate, 6-13% by weight of an alkali metal hydroxide and preferably potassium hydroxide, 27-39% water, 0-4% alkali resistant glass fibre, 0.5-6% hydrogen peroxide or no-ferrous metal powder or other blowing agent and 0.5-4% of talcum.

As an example, the mixture may comprise 14.5% by weight potassium silicate, 8.7% by weight of potassium hydroxide, 32.4% water, 25% metakaolin, 12.3% mica, 1.5% alkali resistant glass fibre 3.8% hydrogen peroxide and 1.8% of talcum.

In some embodiments of the present invention, the composite product may further comprise one or more fibre-based material layers or textile sheets adjacent, set-into or attached to a layer of the mineral polymer.

Said fibre-based layers are preferably fireproof. The term "fibre-based material layer" refers to a layer that consists of, comprises or resembles one or more fibres in the form of a layer, sheet, covering or coating on the surface of the mineral polymer. Use of the fibre-based layers allows the composite products to exhibit high tensile strength as well as impact resistance.

Preferably, the fibre-based material layers comprise mineral fibres. The mineral fibres may be basalt, glass, silicon carbide and/or carbon fibres. The fibres of each layer may be arranged in a predetermined angular orientation.

In embodiments of the invention where the composite product comprises two or more fibre-based material layers, the predetermined angular orientation of fibres of an adjacent second material layer may differ by an incremental amount to the angular orientation of fibres of a first material layer. Preferably the incremental difference between the angular orientation of first and second fibre-base layers is between 1° to 20°.

In some embodiments of the present invention, the composite product may further comprise one or more non-foamed mineral polymer layers. For example, the product may comprise a first layer formed of a foamed mineral polymer and a second layer formed of a non-foamed mineral polymer.

In some embodiments of the invention, the composite product may be a sandwich panel comprising as many as five or more layers. The term 'sandwich panel' is often used in the industry for a composite panels comprising a multitude of three or more layers of different densities or compositions.

As an example, the composite product may comprise five layers: non-foamed mineral polymer, fibrous mesh layer, foamed mineral polymer, fibrous mesh layer and non-foamed mineral polymer and many variations are also envisaged. An additional coating of paint may also be present on the surface of the composite product, or another finish may be applied as a layer adhered to the surface.

In the context of the present invention, the person skilled in the art would understand what is meant by a foamed material and a non-foamed mineral polymer. In contrast to a foamed mineral polymer, a non-foamed material will preferably have less than 10%, and more preferably less than 5%, of its internal volume consisting of gaseous voids. Preferably, the gaseous voids are in the range 50 μm to 5 mm.

The non-foamed mineral polymer layers are preferably prepared from a mixture comprising about 25 to about 35% by weight of metakaolin and further comprising:

about 5 to about 20% by weight of wollastonite;
about 5 to about 15% of an alkali metal silicate; and
about 4 to about 12% of an alkali metal hydroxide.

"Wollastonite" would be understood by those skilled in the art and refers to a calcium inosilicate mineral ($CaSiO_3$) that may contain small amounts of other elements such as iron, magnesium and manganese.

Alternatively, the wollastonite in the mixture may be wholly or partially substituted with one or more fillers including but not limited to, mica (a phyllosilicate) molochite, cordierite, basalt, feldspar, zircon, graphite, borax, basalt powder and fused white mullite.

Preferably the alkali metal silicate is potassium silicate. Preferably, the alkali metal hydroxide is potassium hydroxide.

The non-foamed mineral polymer of the present invention may be prepared from a mixture further comprising one or more additional components as herein described, for example, fillers, talcum, fibrous materials and water.

As an example, the non-foamed mineral polymer of the composite product may consist of 28.87% by weight of metakaolin, 13.2% by weight of wollastonite, 35.2% of water, 12.45% of potassium silicate and 8.8% of potassium hydroxide. It will be understood by those skilled in the art that where appropriate, the amounts up to 100% by weight may be made up of one or more other component(s), for example, water.

Preferably, the non-foamed mineral polymer material used in the invention has a density of 0.8 to 2.0 $g/cm^3$, and more preferably 1.1 to 1.5 $g/cm^3$.

The addition of one or more layers of non-foamed mineral polymer to the foamed mineral polymer can afford an aesthetic surface.

In particular, embodiments of the invention with layered structures (e.g. two or more layers of foamed and non-foamed mineral polymer) have been demonstrated to be lightweight and have high impact resistance and kinetic energy absorption capabilities and may find further uses in fire resistance applications.

The non-foamed mineral polymer may also afford energy spreading properties and the foamed mineral polymer may afford energy absorbing properties. Embodiments of the invention have use in military or civil uses to limit the damage caused by fire and impact. The layered structure may further comprise one or more fibre-based material layers.

It has been found that upon impact, the layered composite product is able to progressively spread and/or absorb energy as the physical source of the impact (e.g. a bullet) impacts the structure and encounters the alternate and different (foamed/non-foamed) mineral polymer layers.

By the alternation of energy spreading, energy absorbing and fibre-based material layers, impacting bodies or projectiles lose their kinetic or ordinance energy and the focus of energy is widened without complete penetration of the multilayer structure or shield. Such embodiments of the present invention may have application as internal shrapnel barriers in shipping or marine applications.

Preferably, layers of the foamed mineral polymer material will have greater average thickness in the layered structure than layers of the non-foamed mineral polymer material.

The number of alternate layers of the foamed mineral polymer material and non-foamed mineral polymer material in the layered structure again can vary depending on the desired use requirements. In some embodiments, there can be 1 to 5 layers, and preferably 2 or 3 layers, of each foamed and non-foamed mineral polymer material in the structure.

A particularly preferred embodiment of the invention is a layered structure which comprises a sequence of five layers, wherein first and last layers and a middle layer comprise a non-foamed mineral polymer material, and layers positioned between the first outer layer and the middle layer, and the middle layer and the second outer layer comprise a foamed mineral polymer material.

The layered structure of the invention may have a non-geopolymeric layer situated adjacent to and/or between a geopolymeric layer(s) comprising a dilatant or shear thickening material. Accordingly, the incorporation of a layer of a dilatant material would assist in the dispersion of impact energy to an adjacent geopolymeric layer in the layered structure, thus providing improved overall impact resistance. Examples of suitable dilatants include polysiloxane-based compositions (e.g. Silly Putty®) and silica nanoparticles dispersed in a solution of poly(ethylene glycol).

To provide additional strength, the layered structure may have one or more metallic layers situated adjacent to and/or between geopolymeric layer(s). "Metallic layer" refers to a sheet, coating, surface or covering comprising a metal. Alternatively, a metallic layer, such as a conductive metallic mesh structure may also be incorporated within a geopolymeric layer.

The layered structure may include a spray-coated metallic outer layer to provide better strength/impact resistance characteristics or indeed provide improved aesthetics. The layered structure may further include high tensile materials such as Kevlar® as an aid to prevention of projectile penetration.

Preferably, the outermost layer of the multilayer structure according to embodiments of the present invention is formed of a non-foamed mineral polymer as described herein. The outermost layer or the front layer, should have sufficient structural integrity and elastic memory to retain the second component of the multilayer structure of the present invention forming an energy absorbing unit within the space between the front and rear layers and permit multiple projectiles to penetrate the layered structure (composite product) without impairing its structural integrity. Movement of the energy absorbing unit will be minimal when impacted by a firearm projectile or other type of projectile, because the energy of the projectile will be efficiently transferred, but with decreased intensity, from a layer comprising rigid foamed geopolymer material to a layer comprising a rigid non-foamed geopolymer material and so on. This is because the mass and density of the projectile will typically be less than the combined mass and of the energy absorbing unit and the capacity of the rigid-foamed geopolymer material to dissipate the ordinance or kinetic energy imparted by the projectile.

The composite products of the invention may take many forms or shapes. The products may be prepared as shaped moulded articles (e.g. curved articles or wavy articles) depending on their desired utility and application.

In certain embodiments of the invention, the composite product comprising the mineral polymer as described herein may be formed as a panel.

It is envisaged that such panels could be used in particular on boats or vehicles. The composite panel product may be incorporated as part of a wall, door or roof component, in some applications using existing framing systems, armoured plating for a military or police vehicle, or a hand-held shield such as those used by riot police.

In some embodiments, the composite product, which may be formed as a panel, may comprise one or more rib-like structures. The rib-like structures are protrusions that extend away from a surface of the product, preferably at 90°±10°, such as substantially 90°, to the surface of the product. Preferably, the rib-like structures comprise a foamed mineral polymer and preferably are formed in a one-piece mould with the rest of the mineral polymer product. They also help to enhance the structural strength of the panel whilst still being lightweight. Those skilled in the art will appreciate that the 'fib-like' structures may take any shape or angle suitable to achieve the technical effect.

A specific embodiment of a composite product according to the present invention will now be described with reference to the representations in FIGS. 1 and 2.

Figure 2:
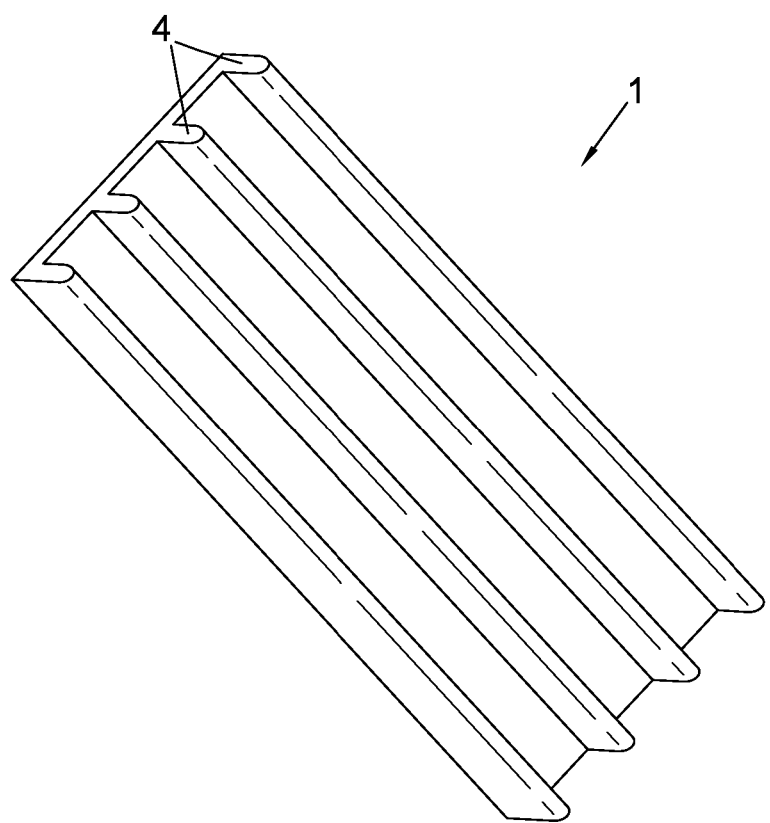
FIG. 2 is a schematic perspective of the composite product of FIG. 1.

With reference to the diagram of FIG. 1, there is depicted the profile of a foamed mineral polymer product in the form of a panel 1 having a front face 2 and a back face 3.

Four rib-like structures 4 protrude from the back face 3 of the panel 1. In alternative embodiments (not shown), the rib-like structures may be on one or both sides of the panel 1. The rib-like structures 4 help to strengthen the panel 1 under bending stress. Those skilled in the art would know that the addition of ribs increases the second moment of area and therefore the overall resistance to bending. They also help to enhance the structural strength of the panel whilst at the same time exhibiting less weight per area than a flat panel of the same stiffness, which would have to be considerably thicker. In use as a cabin wall in a ship for example, if a user of the cabin were to stumble against the wall it would be much less liable to damage.

In another use under compressive stress, a shipping container wall for example, the panel would be capable of withstanding further containers stacked on top of it without buckling. Thus, the panel 1 has utility and is ideally suited to use in marine and transport applications, for example, to replace steel panels used on ships.

The panel 1 comprises a core 5 which is formed of a foamed geopolymer material and an outer layer 6 formed from a mineral fabric. The mineral fabric may be a glass woven fabric or basalt fibre or carbon fibre. These materials are advantageously non-combustible.

The outer layer 6 and core 5 are bonded to each other at interface 7. The interface 7 has been magnified in FIG. 1.

The foamed geopolymer core 5 is prepared from a bulk mixture consisting of 25% by weight of metakaolin flash calcined at approximately 750° C. (J Davidovits, *Geopolymer Chemistry and applications*, p. 160 et seq); 24% by weight of a muscovite mica; 43% by weight of a 29% by weight aqueous potassium silicate solution; 8% by weight of potassium hydroxide and about 1.5% by weight of a blowing agent e.g. hydrogen peroxide. Other embodiments may employ alternative mixtures.

To prepare the foamed geopolymer core 5 of panel 1, the components of the mixture are combined at ambient temperature and agitated until a solution is formed. The solution is added to the base of an open container mould typically 1200×2400 mm and 19 mm in depth.

The core 5 comprises gaseous voids of between 5%, and 80% of its internal volume. The size of the gaseous voids may be between 50 μm to 4 mm. The mineral fabric outer layer 6 is laid into a horizontal mould half, with grooves cut into it corresponding to of the rib-like structures 4. The fabric layer 6 is laid into the grooves so as to line the mould.

In some embodiments of the present invention, the composite product may further comprise one or more non-foamed mineral polymer layers. For example, the product may comprise a first layer formed of a foamed mineral polymer and a second layer formed of a non-foamed mineral polymer.

In an embodiment of the invention, the composite product is a panel comprising a foamed mineral polymer core with fibre-based layer reinforcements on either side such as described herein (FIG. 1), the whole panel being coated on each side or on one side with one or more non-foamed mineral polymer layer(s) to present a hard durable surface for appearance or wear resistance purposes.

An additional coating of paint may also be present. For example, in the context of the embodiment described above, a water-based paint, e.g. a matt emulsion, may be applied to the inner surface of the panel mould or mould lining waterproof membrane. When the panel is demoulded, the paint will transfer itself onto the outer surface of the panel. Advantageously, the application of paint in the mould aids the easy de-moulding of the panel and performs the role often referred to as "mould release" applied to moulds to ease the de-moulding of moulded parts. Additionally, the paint sticks very well to the cured mineral polymer and so forms an aesthetic finish.

Another embodiment of a composite product according to the present invention will now be described with reference to the representations in FIGS. 3a and 3b.

Figure 3A:
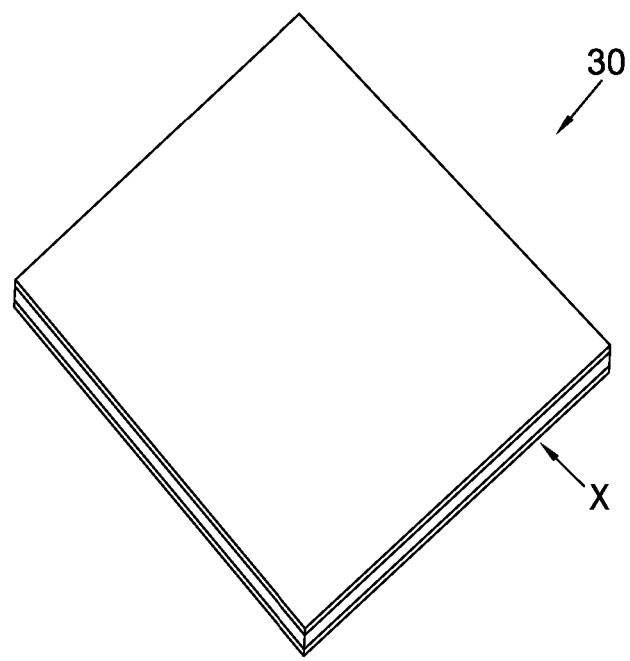
FIG. 3a is a schematic perspective of a composite product according to an embodiment of the invention.
Figure 3B:
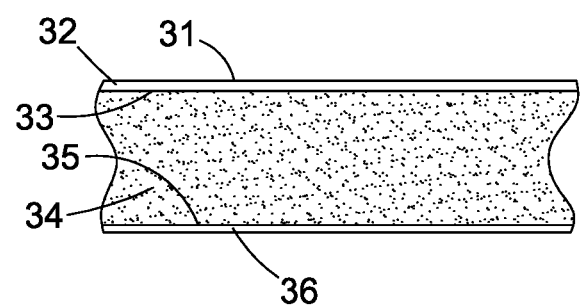
FIG. 3b is a schematic profile of the composite product of FIG. 3a, when viewed in the direction labelled X.

FIG. 3a shows a schematic representation of a composite product in the form of a panel 30 with front and rear faces. Similarly to the composite product of FIGS. 1 and 2, the panel 30 comprises a core 34 formed of a foamed mineral polymer material according to the present invention. Preferably, the foamed mineral polymer core 34 is prepared from a mixture further comprising 0.1 to 4% 'No chlorite, microcrystalline talc, ultrafine D50=1 μm' talcum.

The panel 30 further comprises an outer layer of high strength fibreglass mesh 33 and 35 on front and rear faces respectively. The fibreglass mesh layers 33, 35 strengthen the panel 30 and provide reinforcement. The fibreglass layers 33, 35 may be bonded to the mineral polymer core 34 or alternatively the fibreglass layers 33, 35 may be embedded or substantially enclosed within the core 34 adjacent as surface, before the mineral polymer has been cured.

There is an additional outer layer of non-foamed mineral polymer material 32 and 36 adjacent the fibreglass mesh layers 33, 35 respectively. The non-foamed mineral polymer layers are mechanically and chemically bonded to the fibreglass mesh layers 33, 35 by virtue of the affinity and adhesion between the glass fibre and the aluminosilicate based mineral polymer.

The panel 30 further comprises a third outer layer 31 on the front face comprising a fine weave glass cloth or a fleece. The fine weave glass cloth layer 31 is provided primarily for appearance but may also impart other properties to the panel 30, such increased fire-resistance and impact resistance.

The composite products comprising metakaolin-based mineral polymers of the present invention are heat resistant, fireproof and have surprisingly low density. It has been found that the composite products are insulating to cellulosic fires and can be stronger than steel on a weight basis.

Cellulosic fires are fires that are fuelled by combustibles such as wood, paper, textiles. The temperature of a cellulosic fire typically reaches 500° C. within 5 minutes and can rise to temperatures reaching above 1100° C.

Advantageously the mineral polymer composite products may withstand temperatures of over 1000° C., up to 1200° C., whilst maintaining structural integrity. This is in contrast to marine grade steel panels that start losing mechanical strength between 200 and 300° C. and have little or no structural integrity above 700° C. and structural steel which is thought to lose mechanical strength around 425° C. (Eagar and Musso, 2001).

Another embodiment of a composite product according to the present invention will now be described with reference to the representations in FIGS. 4 and 5.

Figure 4:
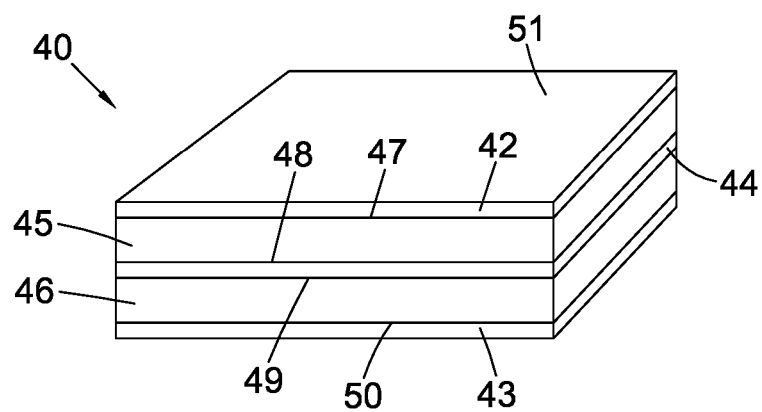
FIG. 4 is a schematic profile of a composite product comprising a layered structure according to an embodiment of the invention.

With reference to the diagram of FIG. 4, there is depicted a multilayer or layered structure in the form of panel 40 having outer layers 42 and 43 and middle layer 44 of a non-foamed geopolymer material, and intermediate layers 45 and 46 of a foamed geopolymer material.

The non-foamed geopolymer material layers act as energy conductive layers and the foamed geopolymer material layers act as energy absorptive layers.

Outer layer 42 and intermediate layer 45, intermediate layer 45 and middle layer 44, middle layer 44 and intermediate layer 46, and intermediate layer 46 and outer layer 43 are bonded to each other at interfaces 47, 48, 49 and 50, respectively. Panel 40 has a front surface 51 and a back surface (not shown).

In accordance with the embodiment of FIG. 4, layers 42, 43 and 44 of non-foamed geopolymer material are prepared from a bulk mixture consisting of 21.9% by weight of metakaolin flash calcined at approximately 750° C.; 37.3% by weight of wollastonite or a muscovite mica; 32.9% by weight of a 34% by weight aqueous potassium silicate solution; and 7.9% by weight of potassium hydroxide.

It has been found that for composite products comprising a non-foamed goepolymer material comprising wollastonite in the mixture, the effect of spalling is reduced. 'Spalling' would be understood by those skilled in the art and refers to the effect wherein flakes of material are expelled from the surface of a material, for example, under the influence of fire.

To prepare the non-foamed geopolymer material, the metakaolin, muscovite mica, aqueous potassium silicate solution and sodium hydroxide components of the mixture are combined at ambient temperature and agitated until a solution is formed. The solution is added to the base of an open square-shaped container mould typically 1200×2400 mm and 19 mm in depth.

Small aluminosilicate monomeric molecules bond together to form long chain molecules yielding a rigid non-foamed geopolymeric material in the base of the mould with a thickness of 1 mm.

Layers 45 and 46 consist of 24.5% by weight of metakaolin flash calcined at approximately 750° C.; 23.2% of a muscovite mica or a wollastonite; 31.6% by weight of a 34% by weight aqueous potassium silicate solution; 7.6% by weight of potassium hydroxide; and 2.7% by weight of hydrogen peroxide as a foaming agent.

While still only partially cured, evidenced by not yet attaining maximum tensile strength, layer 45 (foamed geopolymer material) is prepared in substantially the same manner as layer 42, wherein the silicate solution is applied to what becomes interface 47 between layers 42 and 45 thereby yielding rigid layer 45 with a thickness of 8 mm.

This layer building process is repeated for layers 44, 46 and 43, until the rigid (cured) five-membered geopolymeric layer structure represented in FIG. 4 is formed. Once the structure is cured to a sufficient degree where it can be moved, it may simply be recovered from the mould and allowed to be fully cured.

Figure 5:
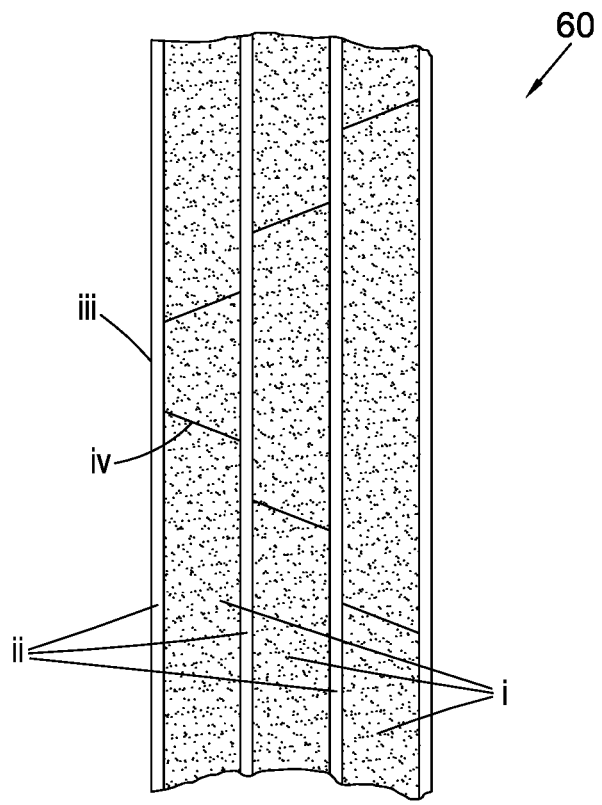
FIG. 5 is a schematic profile of the composite product of FIG. 4, showing dissipation of ordinance energy or projectile energy imparted on the structure by an impacting projectile.

Embodiments of the invention comprising the metakaolin-based mineral polymers such as the embodiment represented in FIGS. 4 and 5 are capable of absorbing significant amounts of ordinance energy, kinetic energy and projectile energy.

With reference to the diagram of FIG. 5, there is depicted a multilayer or layered structure in the form of panel 1 comprising seven alternating layers of a non-foamed geopolymer material (ii), and a foamed geopolymer material (i).

In accordance with the embodiment of FIG. 5, the intense ordinance energy, kinetic energy or projectile energy at the point of impact (identified with number (iii)) of a projectile is spread by the front rigid, energy conductive layer (identified as number (ii)). The conducted energy is then transferred to the first energy absorptive layer (layer (i)) of foamed geopolymer material. The energy is partially absorbed (identified with line (iv)) and transferred to the next energy conductive layer (identified with number (ii)) and so-on through the material i.e. from layers (ii) to layers (i) as shown in FIG. 5.

The result is a very obtuse stepped cone of energy absorption affected material of rapidly decreasing severity (see point of impact of projectile at (iii) and line of dissipation and thus absorption of ordinance, kinetic or projectile energy).

The energy is converted into heat during the process and the projectile kinetic energy is reduced to zero thus avoiding harm to the military platform equipped or personnel carrying the armour.

Those of ordinary skill in the relevant art would be familiar with ways of ascertaining and if necessary calculate with relative accuracy the amount of energy absorption attained by the described structures of the present invention.

The composite product according to the present invention and indeed the individual layers of the product can be of any thickness depending on the weight and impact-resistance and heat or fire-resistance requirements.

However, preferably the composite product has an average thickness of about 0.5 cm to about 20 cm, more preferably about 1 cm to about 10 cm, and most preferably about 1 cm to about 5 cm.

Preferably, each layer of the composite product has an average thickness of about 1 mm to about 50 mm, preferably about 1 mm to about 20 mm, and most preferably about 1 mm to about 10 mm. Layers of the foamed and/or non-foamed mineral polymer material within a product may have the same or approximately the same average thickness.

The composite panel products of the present invention display substantially the same physical strength as steel sheets currently used in marine and/or transport applications but with lower weight thus increasing the load capacity of the craft and reducing fuel consumption.

Figure 6:
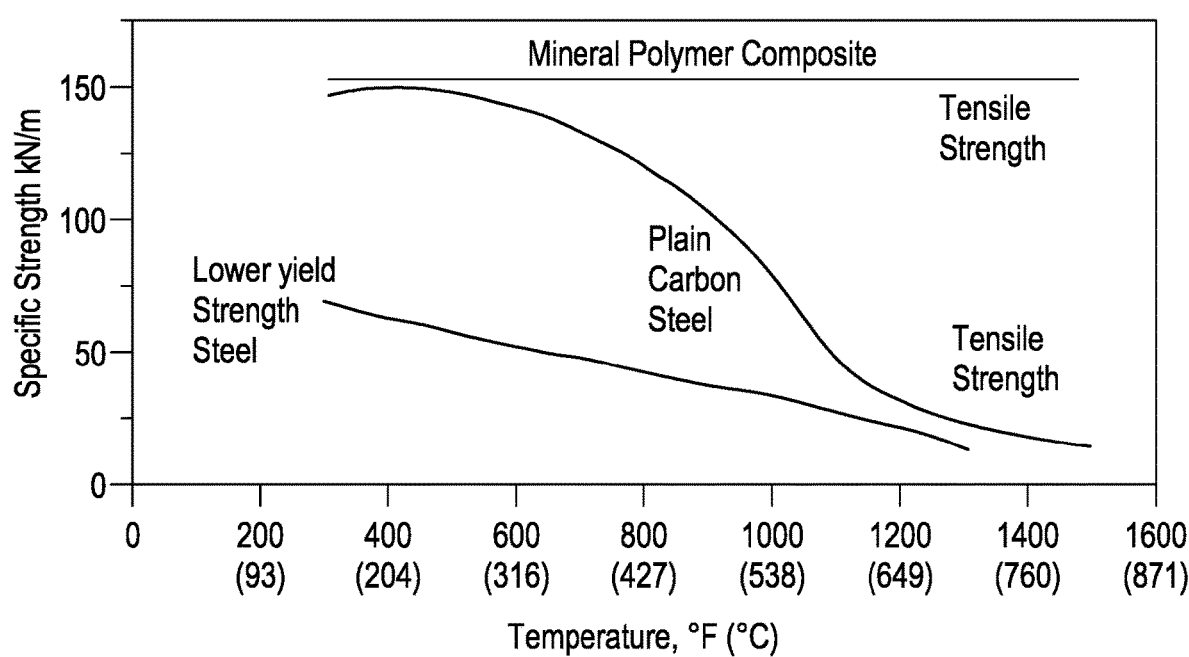
FIG. 6 shows the yield and tensile strength of plain carbon steel (SA-192) as a function of temperature.

A graph showing the lower yield strength of plain carbon steel (SA-192) as a function of temperature is shown in FIG. 6 (Nalco Company, 2011). The graph shows that the yield strength and tensile strength of steel rapidly deteriorates at temperatures above 400° C., and has significantly reduced strength above 1000° C. In contrast, composite product panels comprising the foamed mineral polymer according to the present invention may withstand temperatures over 1000° C., and may even withstand temperatures up to 1200° C. whilst still maintaining structural integrity.

In other embodiments, the composite product may be incorporated in a range of articles which include but are not limited to items of protective clothing and to non-clothing items also used for a protective purpose. Items of protective clothing may include protective helmets (e.g. combat helmets), vests or jackets, arm guards and leg guards. The composite product may be formed into a shaped plate for insertion into a fire-proof or bullet-proof vest or jacket.

Additionally, individual plates could be custom-made to suit the body dimensions of a specific wearer. Such plates may be joinable to provide a protective suit arrangement.

The relatively lightweight nature of clothing articles comprising the mineral polymer of the invention compared to those with a metal- or ceramic-based construction permits greater mobility and agility for a wearer than many existing forms of protective clothing while not compromising the impact resistance of the clothing and thus the safety of the wearer.

The example embodiments of the composite product described herein are thermally insulating and a thermal gradient is set up across the thickness of the material, thus slowing the transfer of heat. Such a property may be useful in fire protection of for example vehicles, such as, fire engines or military trucks such as armoured personnel carriers and tanks or specifically for fire crew helmets, battery casings, equipment casings and areas in and around take-off sites on aircraft carriers.

The mineral polymer of the present invention would make it an ideal candidate for use in transport and/or military applications, but uses are not limited to these areas.

A further potential benefit of employing a mineral polymer-based material is that these materials are less radar reflective than a metallic material (e.g. steel) and thus may find utility in assisting the concealment of military vehicles (e.g. tanks or armoured personnel carriers) if the metallic protective armour plating of the vehicle is replaced or partly replaced with a geopolymeric layered structure of the invention. Alternatively, the geopolymer products of the invention may be used to coat or substantially coat metallic material.

According to the second aspect of the present invention, there is provided a use of a composite product as described herein, as a fire resistance, fire proof and/or thermally insulating material.

The composite product as described herein, may also be provided for use as an impact resistance material.

According to the third aspect of the present invention, there is provided a method of preparing a composite product, the method comprising: providing a mineral polymer prepared from a mixture comprising about 7 to about 53% by weight of metakaolin. Preferably, the mixture comprises about 20 to about 40% by weight of metakaolin.

In some embodiments, the method comprises providing a first layer (i) comprising a foamed mineral polymer prepared from a mixture comprising 20 to 30% by weight of metakaolin;

providing at least a second layer comprising
(ii) a non-foamed mineral polymer prepared from a mixture comprising about 25 to about 35% by weight of metakaolin; or
(iii) a fibre-based material.

The composite product may be prepared in a conventional moulding process. This can be achieved by adding alternate and/or successive layers of the foamed mineral polymer (i) with one or more layers of non-foamed mineral polymer (ii) and/or fibre-based material (iii) as appropriate to build up a pre-determined structure within a mould.

The method may comprise binding the two or more layers using an adhesive or other fixing means (e.g. bolts, screws, pins). In this embodiment, it is envisaged that the layers of mineral polymer material will be provided pre-fabricated (for example, prepared in a mould or otherwise).

Alternatively, the method comprises applying a second layer of (i), (ii) or (iii) to a first layer of (i) or vice versa. The mineral polymer layers (i) and (ii) may be provided as a pre-cured or cured mixture.

Applying a subsequent layer prior to the complete curing of an existing layer enables a strong bonding interaction between mineral polymer layers resulting in a unitary product with layers firmly bonded.

According to the present invention, methods of preparation of the composite products may be within heated presses on a batch basis or as a continual extrusion process and are controllable and repeatable.

An illustrative method for preparing a composite product according to the present invention will now be described.

A panel production method may comprise a flat mould, a mould lid and a press that can be heated. A sheet of material, for example a lightweight alkali resistant glass cloth, may then be placed in the horizontal flat mould. The sheet of material may be larger by an amount at least as much as the thickness of the finished panel so that when laid into the mould it lines the internal edges of the mould.

A layer of non-foamed mineral polymer may then be poured or sprayed into the mould to coat the glass cloth evenly. A foamed mineral polymer composition may then be poured onto the non-foamed mineral polymer layer.

Whilst the foamed mineral polymer is rising and curing, a second sheet of glass cloth may be laid on top of the rising surface and the top of the mould placed onto the mould. The mould may then be heated to accelerate the curing process, preferably between 40-90° C., which will typically take 5 to 45 minutes to complete. The press would then be opened and the cured or semi-cured panel may then be removed from the mould and the next panel production commenced.

Mineral polymer curing is a gradual process and although hardening of the material will take place rapidly in the presence of heat, it may be necessary to leave the panel in the press until it is fully cured and up to full strength.

The production may thus be made faster and more efficient by removal of the panels when they have reached a state of cure sufficiently advanced that they are rigid enough to be removed without damage.

Over the hours and days following the moulding process the cure should complete and the panel should attain its full strength According to the fourth aspect of the present invention, there is provided a kit of parts comprising a mineral polymer as described herein and instructions for use.

In addition, electronic sensors and control mechanisms may be incorporated to monitor the performance of the panel in all its aspects and to provide appropriate warnings and to trigger actions in response to temperature and other changes.

Materials and Methods

Definitions

"Composite product" or "composite material" refers to a product or material made from two or more constituent materials with different properties. In the context of the present invention, the composite products comprise two or more layers, each comprised of a different material, which may be attached, for example, by bonding or clamping.

"Mineral polymers", also known synonymously as "geopolymers", are a member of a class of synthetic aluminosilicate polymeric materials. They are formed by reacting, for example via dissolution, an aluminosilicate in an alkaline silicate solution or an acidic medium, which upon condensation (curing) forms a mouldable, homogeneous polymeric product.

A "foamed mineral polymer" is a mineral polymer comprising trapped pockets or voids of gas. A blowing or foaming agent is typically used in the preparation of a foamed mineral polymer.

A "non-foamed mineral polymer" is a mineral polymer that is substantially free of trapped gas, although small amounts of trapped gas may be present.

A blowing agent, also referred to as foaming agent or gaseous agent may be any blowing agent suitable in the preparation of geopolymer materials including hydrogen peroxide or non-ferrous metals such as aluminium powder or zinc powder.

The "fibrous material" refers to a material consisting of, comprising or resembling fibres.

The "filler" may be any filler suitable in the preparation of geopolymer materials and may be a functional fillers or a mineral filler.

The "talcum" may be any talcum suitable in the preparation of geopolymer materials.

The "fibre-based material layer" refers to a material that consists of, comprises or resembles one or more fibres in the form of a layer, sheet, covering or coating on the surface of the mineral polymer.

"Panel" has the ordinary everyday meaning and typically refers to a flat, or substantially flat component that forms or is set into the surface of a door, wall or ceiling but is not limited to this use.

A "cellulosic fire" is a fire fuelled by combustibles such as wood, paper, textiles. The temperature of a cellulosic fire typically reaches 500° C. within 5 minutes and can rise to temperatures reaching above 1100° C.

The term "about" means±0.5% or ±1%. Preferably, the term "about" means±0.5%.

EXAMPLES

Example Formulations

Mineral polymers were prepared from the following mixtures.

| Formulation 1 | wt % |
|---|---|
| Potassium silicate solution (aqueous; around 30-50% w/w) | 40.6 |
| Potassium hydroxide | 9.7 |
| Water | 11.9 |
| Metakaolin | 7.0 |
| Mica | 29.7 |
| Talc | 1.1 |
| Total | 100 |
| Tensile strength | 9 MPa |

| Formulation 2 | wt % |
|---|---|
| Potassium silicate solution (aqueous; around 30-50% w/w) | 30.4 |
| Potassium hydroxide | 7.3 |
| Water | 8.9 |
| Metakaolin | 52.6 |
| Talc | 0.8 |
| Total | 100 |
| Tensile strength | 3.07 MPa |

| Formulation 3 | wt % |
|---|---|
| Potassium silicate solution (aqueous; around 30-50% w/w) | 35.6 |
| Potassium hydroxide | 8.6 |
| Water | 10.5 |
| Metakaolin | 9.5 |
| Talc | 35.8 |
| Total | 100 |

| Formulation 4 | wt % |
|---|---|
| Potassium silicate solution (aqueous; around 30-50% w/w) | 26.3 |
| Potassium hydroxide | 6.3 |
| Water | 7.7 |
| Metakaolin | 7.0 |
| Mica | 52.7 |
| Total | 100 |
| Tensile strength | 10.66 |

| Formulation 5 | wt % |
|---|---|
| Water | 6.0 |
| Potassium hydroxide | 5.0 |
| Metakaolin | 13.4 |
| Potassium silicate solution (aqueous; around 30-50% w/w) | 17.1 |
| 50 μm Basalt powder | 58.5 |
| Total | 100 |

| Formulation 6 | wt % |
|---|---|
| Potassium silicate solution (aqueous; around 30-50% w/w) | 73.5 |
| Potassium hydroxide | 4.9 |
| Metakaolin | 19.6 |
| Talc | 2.0 |
| Total | 100 |

| Formulation 7 | wt % |
|---|---|
| Potassium silicate solution (aqueous; around 30-50% w/w) | 60.5 |
| Potassium hydroxide | 21.8 |
| Metakaolin | 16.1 |
| Talc | 1.6 |
| Total | 100 |

| Formulation 8 | wt % |
|---|---|
| Potassium silicate solution (aqueous; around 30-50% w/w) | 15.9 |
| Potassium hydroxide | 3.8 |
| Water | 32.3 |
| Metakaolin | 24.6 |
| Mica | 23.3 |
| Talc | 0.1 |
| Total | 100 |

| Formulation 9 | wt % |
|---|---|
| Potassium silicate solution (aqueous; around 30-50% w/w) | 80.6 |
| Potassium hydroxide | 5.4 |
| Metakaolin | 14.0 |
| Total | 100 |

Fire Resistance

An indicative non-combustibility test (standard number BS EN ISO 1182:2010) was performed on a 25 mm thick piece of mineral polymer foam material according to the present invention.

The sample of foamed mineral polymer was prepared from the following mixture:

|  | wt % |
| --- | --- |
| Potassium hydroxide | 9.7 |
| Potassium silicate solution (aqueous; around 30-50% w/w) | 31.5 |
| Metakaolin | 24.4 |
| Mica | 23.1 |
| $H_2O_2$ | 2.1 |
| Water | 9.2 |

The results are shown in Table 1 below. Class A1 is non-combustible and the requirement level cannot be combined with any additional class.

TABLE 1

|  | Mineral Polymer Foam | A1 Requirement |
| --- | --- | --- |
| Furnace thermocouple temperature rise, $\Delta T$ (° C.) ($T_f$ maximum – $T_f$ final) | 1.5 | ≤30 |
| Specimen surface thermocouple temperature rise, $\Delta T_s$ (° C.) ($T_s$ maximum – $T_s$ final) | 0.6 | N/A |
| Duration of sustained flaming (seconds) | Nil | Nil |
| Mass loss (%) | 9.79 | ≤50 |

A further novel testing method, Heat-Transfer Rate Inducing System (H-TRIS) was performed on a sample of mineral polymer foam (see formulation above) according to the present invention 21 mm thick with an alkali resistant glass mesh on both sides. The test was also performed on PET (Fire retardant structural core) for comparison.

A total of four composite sandwich panel samples (coated and uncoated, mineral and Polyethylene-Terephthalate (PET) foam sandwich panels) were tested.

The thermal exposure was imposed by direct control of the incident heat flux at the exposed surface of each sample. Time-to-failure was measured, according to the insulation criteria presented in standard number BS EN 1363-1:2012 and the results are shown in Table 2.

Failure is reached when:
a) average temperature increase at the unexposed surface is above the initial average temperature by more than 140 K; or
b) temperature at any location at the unexposed surface increased above the initial average temperature by more than 180 K.

At the end of the test the PET material was structurally damaged and gave off a significant amount of smoke during burning, whereas the mineral polymer foam was intact both during burning and after the test giving off no detectable smoke or fumes.

TABLE 2

| Material | Exposed Surface | Duration of the test | Time to reach an average temperature increase of 140 K | Time to reach a temperature increase of 180 K at any location |
| --- | --- | --- | --- | --- |
| Mineral Polymer Foam | Uncoated | 15 min | 7.9 min | 8.4 min |
| Mineral Polymer Foam | Intumescent coated | 15 min | 9.3 min | 9.9 min |
| PET | Uncoated | 10 min | 4.5 min | 4.5 min |
| PET | FF88 coated | 15 min | 8.0 min | 8.2 min |

The results showed that all samples experienced an average temperature increase of 140 K at their unexposed surfaces during the first 10 minutes of the test. The addition of an intumescent coating showed an almost negligible performance increase for the mineral foam composite sample, but a more significant enhancement for the performance for PET foam sample.

Specific Strength

A ship's cabin wall is typically a 0.6 mm thick steel hot rolled steel sheet backed with mineral wool (for instance Rockwool®). A typical structural steel has a breaking stress of 250 MPa, that is, a square metre section would break with a force of 250,000,000 Newtons and a 0.6 mm sheet would break at 250,000,000×0.0006=150,000 Newtons.

Steel has a density of, typically 7,880 kg per cubic metre. A square metre of the 0.6 mm steel sheet weighs 7.88×0.0006=4.728 kg.

A composite product according to the present invention in the form of a sheet/panel consisting of woven basalt fibre cloth bound with a mineral polymer matrix was provided. The product was prepared by coating layers of basalt fabric with a formulation of non-foamed mineral polymer and layering these coated sheets on top of each other. This material was waterjet cut into five test samples that were subjected to physical and chemical testing.

The mineral polymer was prepared from the following mixture:

|  | wt % |
| --- | --- |
| Potassium hydroxide | 9.9 |
| Potassium silicate solution (aqueous; around 30-50% w/w) | 32.2 |
| Metakaolin | 24.9 |
| Mica | 23.6 |
| Water | 9.4 |

The mineral polymer sheet composite with basalt fibre had a density of approximately 2,000 kg per cubic metre. A square metre of said composite weighing the same as the aforementioned steel sheet (4.728 kg) would be 4.728/2,000=0.00234 m or 2.364 mm thick.

Tensile strength was measured. Five test-pieces were prepared from 200×25×5 mm strips by gluing Tufnol® end-tabs on both faces to leave a 100 mm gauge-length. The tests were conducted in an Instron 4507 universal testing machine with a calibrated load cell using flat tensile grips contacting the end-tabs. The tests were carried out in accordance with ISO 527-4. Tests were made at a cross-head displacement rate of 2 mm/min.

TABLE 3

| Test-piece | Peak stress MPa | Strain at peak stress, % |
| --- | --- | --- |
| 1 | 72.8 | 2.4 |
| 2 | 58.3 | 2.4 |
| 3 | 58.8 | 2.3 |
| 4 | 69.4 | 2.7 |
| 5 | 64.1 | 2.6 |
| Mean | 64.3 ± 6.9 | 2.5 |

The mineral polymer composite sheets that were tested had an average breaking stress of 64.3 MPa. That is, a square metre section would break with a tensile force of 64,300,000 Newtons.

Therefore a strip a metre wide and 2.364 mm thick would break with a force of 64,300,000×0.002364=152,005 Newtons.

Thus, the composite material had a specific strength similar to that of structural steel.

Bending Stress

The composite products of the present invention show great improvements in bending stress over steel. An explanation is provided below.

As seen above (see 'Specific strength'), a sheet of mineral polymer composite can have the same mass per square metre as a steel sheet that is approximately 4 times thinner. The stiffness of a sheet/panel is proportional to the cube of the thickness of the sheet.

The moment plate constant (D) used in calculations of sheet material displacement is defined by $D=Et3/12(1-v2)$ where E is the elastic modulus, t is the thickness and v is the Poisson's radius of the material (C Young, 1989).

Thus the quantity D is multiplied eight times if t is doubled and 64 times if t is four times thicker. In Roark a number of equations are given to calculate the deflection of a plate under stress and in all of them the deflection is inversely proportional to the value of D. Thus any increase in thickness of a plate gives a significantly magnified resistance to deflection.

The values of E and Poisson's ratio for a mineral polymer composite will be dominated by the properties for the fibre reinforcement. For instance the value of E for basalt fibre is half that of steel but the cubed function oft outweighs that effect considerably.

The difference in value of Poisson's ratio for the two materials is even smaller (0.3 for steel and 0.25 for basalt) and thus the dominating variable determining the stiffness of a panel is its thickness.

The increase in thickness possible with a mineral polymer composite versus a steel sheet weight for weight would improve the stiffness of a panel including mineral polymer composites.

Furthermore, the maximum stresses when a panel is bending occurs at the surface of the plate. If a high strength "skin" is put on the outer faces of a sandwich panel, the effective stiffness is greatly enhanced and the core of the panel may be made of a much weaker material, for example, a light foam.

The construction of a light foam thick "filling" e.g. a composite panel with a high tensile skin allows the core to be very low density, for example 0.3 kg/l. The lower density magnifies the specific strength effect described above.

Impact Resistance

To demonstrate the impact resistance capabilities of embodiments of the composite product of the present invention, four individual composite product panels with layered structures were prepared.

Each layered structure (10 cm×10 cm) consisted of three flat panels bonded together having a total thickness of 10 mm. Each panel was prepared in an analogous manner to that described above. The structure of the panels consisted of an 8 mm thick square of the foamed geopolymer material bound (sandwiched) between two 1 mm thick square (10 cm×10 cm) panels of the non-foamed geopolymer material. Basalt fabric layers were provided between the foamed and non-foamed layers.

| Foamed geopolymer | wt % |
| --- | --- |
| Potassium hydroxide | 9.7 |
| Potassium silicate solution (aqueous, around 30-50% w/w) | 31.5 |
| Metakaolin | 24.4 |
| Mica | 23.1 |
| $H_2O_2$ | 2.1 |
| Water | 9.2 |

| Non-foamed geopolymer | wt % |
| --- | --- |
| Potassium hydroxide | 4.3 |
| Metakaolin | 15.9 |
| Potassium silicate solution (aqueous, around 30-50% w/w) | 20.2 |
| White fused mullite (filler) | 23.0 |
| Cordierite | 28.8 |
| Water | 7.8 |

The four layered structures were stacked and clamped together in an overlapped manner and placed in a fixed positioned with the larger panel surfaces oriented in a vertical position. A 0.22 long rifle bullet was fired from a gun at one of the outer panel surfaces from a distance of 50 metres. Upon inspection post-impact, the bullet passed through the first layered structure with an exit hole of about 25 mm in diameter. The bullet passed through the second layered structure with an exit hole of 50 mm diameter. The bullet did not fully penetrate the third layered structure, but there was some minor damage to the non-foamed geopolymer panel where exit of the bullet may have been expected. The fourth layered structure had no exit hole or other damage indicating that the bullet did not penetrate.

Accordingly, the impact resistance of a 40 mm thick layered structure in accordance with the invention has been demonstrated to be sufficient to halt a 0.22 long rifle bullet fired from a range of 50 metres.

A further example is as follows. A panel is made with a rigid outer layer and inner layer and one thick layer of rigid foamed geopolymer material in between, in the order of 100 to 200 mm thick.

The panel comprises the outer shell of a military personnel vehicle such as a patrol vehicle.

A known problem is improvised explosive devices (IEDs) that are hidden by enemy forces along the route of patrol vehicles and detonated from a distance when a patrol vehicle is passing.

The blast force exerted on the vehicle with steel armour is transferred to the vehicle directly and will either destroy the armour and injure the crew or project the vehicle away at a rate that can cause injury to the crew.

A deformable and energy absorbing layer such as described has two beneficial effects. The first effect is to extend the time for the blast energy is transferred to the vehicle, since energy is force times distance, thus reducing considerably the force exerted on the vehicle and reduce the tendency for the vehicle to be projected away from the source of the blast violently. The second effect is to absorb the blast energy as the foam layer collapses, thus protecting the crew from injury.

REFERENCES

1. J. Davidovits (2008), *Geopolymer Chemistry and Applications*, p. 160 et seq.
2. T. W. Eagar and C. Musso (2001), "Why Did the World Trade Center Collapse? Science, Engineering, and Speculation", Journal of minerals, metals and materials society, 53, 12, pp 8-11.
3. "Nalco Company: Nalco Guide to Boiler Failure Analysis" (2011), Second Edition. Short-Term Overheating, Access Engineering, McGraw-Hill Professional.
4. Warren C Young (Roark) (1989), *"Roark's Formulas for Stress and Strain"*.

What is claimed is:

1. A method for making a composite product comprising two or more layers, wherein at least one layer comprises a foamed mineral polymer, and at least one layer comprises a non-foamed mineral polymer, wherein the layers are obtained by:
   a) providing at least one layer of a first mixture comprising 20 to 40% by weight of metakaolin to prepare the foamed mineral polymer layer;
   b) providing at least one layer of a second mixture comprising 15 to 40% by weight of metakaolin; >0 to 65% by weight of filler selected from the group consisting of wollastonite,
   molochite, cordierite, feldspar, zircon, borax, basalt powder, talc, and mullite; 5 to <30% by
   weight of alkali metal silicate; and 1 to 22% by weight of alkali metal hydroxide, to prepare the non-foamed mineral polymer layer; and
   c) joining the foamed mineral polymer layer to the non-foamed mineral polymer to form the
   composite product,
   and wherein the composite product is stronger than structural steel with a breaking stress of 250 MPa on a weight basis.

2. The method of claim 1, wherein the first mixture further comprises >0 to 65% by weight of filler.

3. The method of claim 1, wherein the first mixture further comprises 1 to 22% by weight of an alkali metal hydroxide.

4. The method of claim 1, wherein the first mixture further comprises 5 to 81% by weight of an aqueous alkali metal silicate solution, with 15 to 50% by weight of an alkali metal silicate relative to a solvent in the silicate solution.

5. The method of claim 1, wherein the first mixture further comprises 0.01 to 20% by weight of a blowing agent.

6. The method of claim 1, wherein the first mixture further comprises: up to 30% by weight of a mica;
   4 to 22% by weight of an alkali metal hydroxide;
   13 to 81% by weight of an aqueous alkali metal silicate solution that is made from
   15 to 50% by weight of an alkali metal silicate relative to a solvent in the silicate solution;
   0.05 to 6% by weight of a blowing agent; and
   optionally water.

7. The method of claim 1, wherein the first mixture comprises: 20 to 30% by weight of the metakaolin:
   5 to 15% by weight of mica;
   10 to 20% by weight of an alkali metal silicate;
   6 to 13% by weight of an alkali metal hydroxide;
   0 to 4% by weight of an alkali resistant glass fibre;
   0.5 to 6% by weight of a blowing agent;
   0.5 to 4% by weight of talcum;
   and optionally water.

8. The method of claim 1, wherein the composite product further comprises one or more fibre-based material layers.

9. The method of claim 8, wherein the one or more fibre-based material layers comprise a mineral fibre.

10. The method of claim 9, wherein the mineral fibre is selected from the group consisting of: basalt, glass, silicon carbide and carbon fibres.

11. The method of claim 8, wherein the composite product comprises two or more fibre-based material layers, each of the two or more fibre-based layers comprising fibres that are all arranged in a same first predetermined angular orientation that differs from a second predetermined angular orientation of all fibres in an adjacent fibre-based material layer by between 1° to 20°.

12. The method of claim 1, wherein the alkali metal silicate is potassium silicate and the alkali metal hydroxide is potassium hydroxide.

13. The method of claim 1, comprising providing two or more layers of the first mixture in addition to the at least one layer of the second mixture.

14. The method of claim 1, wherein the first mixture is cured to produce the foamed mineral polymer layer which has a density of 0.05 to 0.9 g/cm3.

15. The method of claim 1, wherein the second mixture is cured to produce the non-foamed mineral polymer which has a density of 0.08 to 2.0 g/cm3.

16. The method of claim 1, wherein either one or both of the first mixture and the second mixture further comprises one or more fibrous materials.

17. The method of claim 1, wherein the composite product comprises an inner layer and at least one outer layer, wherein the inner layer comprises the foamed mineral polymer layer.

18. The method of claim 1, wherein the method of joining further comprises binding the two or more layers using an adhesive or other fixing means.

* * * * *